US008566107B2

(12) United States Patent
Oh et al.

(10) Patent No.: US 8,566,107 B2
(45) Date of Patent: *Oct. 22, 2013

(54) MULTI-MODE METHOD AND AN APPARATUS FOR PROCESSING A SIGNAL

(75) Inventors: Hyen-O Oh, Seoul (KR); Hong Goo Kang, Seoul (KR); Chang Heon Lee, Seoul (KR); Sang Wook Shin, Seoul (KR); Yang Won Jung, Seoul (KR)

(73) Assignees: LG Electronics Inc., Seoul (KR); Intellectual Discovery Co., Ltd., Seoul (KR)

( * ) Notice: Subject to any disclaimer, the term of this patent is extended or adjusted under 35 U.S.C. 154(b) by 634 days.

This patent is subject to a terminal disclaimer.

(21) Appl. No.: 12/738,064

(22) PCT Filed: Oct. 15, 2008

(86) PCT No.: PCT/KR2008/006075

§ 371 (c)(1),
(2), (4) Date: Aug. 24, 2010

(87) PCT Pub. No.: WO2009/051401

PCT Pub. Date: Apr. 23, 2009

(65) Prior Publication Data

US 2010/0312567 A1 Dec. 9, 2010

Related U.S. Application Data

(60) Provisional application No. 60/980,149, filed on Oct. 15, 2007.

(51) Int. Cl.

| | |
|---|---|
| ***G06F 17/00*** | (2006.01) |
| ***G10L 19/00*** | (2013.01) |
| ***G10L 19/02*** | (2013.01) |
| ***G10L 21/00*** | (2013.01) |

(52) U.S. Cl.

USPC ........ 704/500; 704/200; 704/200.1; 704/201; 704/203; 704/208; 704/206; 704/210

(58) Field of Classification Search

USPC .............. 704/200, 200.1, 201, 203, 206, 208, 704/210, 500

See application file for complete search history.

(56) References Cited

U.S. PATENT DOCUMENTS 5,911,128 A 6/1999 DeJaco
6,108,626 A 8/2000 Cellario et al.

(Continued)

FOREIGN PATENT DOCUMENTS

CN 1131994 A 9/1996
CN 1221169 A 6/1999

(Continued)

OTHER PUBLICATIONS

Ramprashad, Sean A. "A multimode transform predictive coder (MTPC) for speech and audio." Speech Coding Proceedings, 1999 IEEE Workshop on. IEEE, 1999.*

(Continued)

*Primary Examiner* — Paras D Shah
(74) *Attorney, Agent, or Firm* — Birch, Stewart, Kolasch & Birch, LLP

(57) ABSTRACT

Disclosed is a method of processing a signal, which includes receiving at least one of a first signal and a second signal, receiving mode information, and decoding the at least one of the first signal and the second signal using at least one of a first coding scheme and a second coding scheme according to the mode information. The mode information is information for indicating that a prescribed mode corresponds to one of at least three modes. The method includes detecting when a restricted mode change occurs and changing at least one mode when detecting a restricted mode change.

7 Claims, 9 Drawing Sheets

(56) References Cited

U.S. PATENT DOCUMENTS

| | | | | |
|---|---|---|---|---|
| 6,134,518 | A * | 10/2000 | Cohen et al. | 704/201 |
| 6,209,012 | B1 | 3/2001 | Baudendistel | |
| 6,230,124 | B1 | 5/2001 | Maeda | |
| 6,373,411 | B1 | 4/2002 | Shoham | |
| 6,475,245 | B2 * | 11/2002 | Gersho et al. | 704/208 |
| 6,484,138 | B2 * | 11/2002 | DeJaco | 704/221 |
| 6,647,366 | B2 * | 11/2003 | Wang et al. | 704/201 |
| 6,658,383 | B2 * | 12/2003 | Koishida et al. | 704/229 |
| 6,675,144 | B1 | 1/2004 | Tucker et al. | |
| 6,691,084 | B2 | 2/2004 | Manjunath et al. | |
| 6,785,645 | B2 | 8/2004 | Khalil et al. | |
| 7,054,809 | B1 * | 5/2006 | Gao | 704/229 |
| 7,072,366 | B2 * | 7/2006 | Parkkinen et al. | 370/538 |
| 7,127,390 | B1 * | 10/2006 | Su | 704/221 |
| 7,280,960 | B2 * | 10/2007 | Wang et al. | 704/219 |
| 7,596,486 | B2 * | 9/2009 | Ojala et al. | 704/201 |
| 7,613,606 | B2 * | 11/2009 | Makinen | 704/221 |
| 7,634,402 | B2 * | 12/2009 | Lee et al. | 704/229 |
| 7,739,120 | B2 * | 6/2010 | Makinen | 704/501 |
| 7,979,271 | B2 * | 7/2011 | Bessette | 704/219 |
| 7,996,234 | B2 * | 8/2011 | Dieterich et al. | 704/500 |
| 8,060,363 | B2 | 11/2011 | Ramo et al. | |
| 8,090,573 | B2 * | 1/2012 | Manjunath et al. | 704/201 |
| 2002/0161576 | A1 | 10/2002 | Benyassine et al. | |
| 2002/0178418 | A1 | 11/2002 | Ramprashad et al. | |
| 2003/0009325 | A1 * | 1/2003 | Kirchherr et al. | 704/211 |
| 2005/0004793 | A1 * | 1/2005 | Ojala et al. | 704/219 |
| 2005/0055203 | A1 * | 3/2005 | Makinen et al. | 704/229 |
| 2005/0267742 | A1 * | 12/2005 | Makinen | 704/219 |
| 2006/0173675 | A1 | 8/2006 | Ojanpera | |
| 2008/0027715 | A1 * | 1/2008 | Rajendran et al. | 704/205 |
| 2008/0147414 | A1 | 6/2008 | Son et al. | |
| 2008/0162121 | A1 * | 7/2008 | Son et al. | 704/201 |
| 2008/0192947 | A1 | 8/2008 | Ramo et al. | |
| 2009/0187409 | A1 * | 7/2009 | Krishnan et al. | 704/262 |
| 2010/0017198 | A1 | 1/2010 | Yamanashi et al. | |
| 2010/0017202 | A1 | 1/2010 | Sung et al. | |
| 2011/0202353 | A1 | 8/2011 | Neuendorf et al. | |

FOREIGN PATENT DOCUMENTS

| | | | |
|---|---|---|---|
| CN | 101025918 | A | 8/2007 |
| EP | 0 206 352 | A2 | 12/1986 |
| GB | 1 278 184 | A2 | 1/2003 |
| JP | 2005-215502 | A | 8/2005 |
| JP | 2010-530079 | A | 9/2010 |
| MX | PA06012578 | A | 12/2006 |
| RU | 2 146 394 | C1 | 3/2000 |
| RU | 2 158 478 | C2 | 10/2000 |
| WO | WO 2005/114654 | A1 | 12/2005 |
| WO | WO 2008/151755 | A1 | 12/2008 |

OTHER PUBLICATIONS

Ahmadi, S.; Jelinek, M., "On the architecture, operation, and applications of VMR-WB: the new cdma2000 wideband speech coding standard," Communications Magazine, IEEE , vol. 44, No. 5, pp. 74,81, May 2006.*

Ramprashad, "A Multimode Transform Predictive Coder (MTPC) for Speech and Audio", Speech Coding Proceedings, IEEE Workshop, Jun. 1999, pp. 10-12.

3GPP, "3rd Generation Partnership Project;Technical Specification Group Service and System Aspects; Audio codec processing functions; Extended Adaptive Multi-Rate—Wideband (AMR-WB+) codec; Transcoding functions (Release 6)", 3GPP TS 26.90, V6.3.0, Jun. 2005, pp. 1-85, XP050370252.

Najaf-Zadeh et al., "Narrowband Perceptual Audio Coding: Enhancements for Speech", Proc. European Conf. Speech Commun., Technol, (Aalborg, Denmark), Sep. 2001, pp. 1993-1996.

Vinton et al., "A Scalable and Progressive Audio Codec", IEEE International Conference on Acoustics, Speech, and Signal Processing Proceedings (ICASSP), vol. 5, May 7, 2001, pp. 3277-3280, XP010803393.

Combescure et al., "A 16, 24, 32 Kbit/s Wideband Speech Codec Based on ATCELP", IEEE, 1999, pp. 5-8.

Shin et al., "Designing a Unified Speech/Audio Codec by Adopting A Single Channel Harmonic Source Separation Module", IEEE, ICASSP, 2008, pp. 185-188.

Zhang et al., "A Scalable Low Bitrate Audio and Speech Coder", 2007 International Symposium on Communications and Information Technologies (ISCIT 2007), IEEE, 2007, pp. 1561-1565.

Kim et al., "Multi-Mode Harmonic Transform Excitation LPC Coding for Speech and Music," Eighth International Conference on Spoken Language Processing, Oct. 2004, pp. 104.

* cited by examiner

FIG. 4

| Mode | criterion | Speech coding (kbit/s) | Audio coding (kbit/s) |
|---|---|---|---|
| A | $Thr_A < Pow_{ratio} \le 1$ | 19.85 | 0 |
| B | $Thr_B < Pow_{ratio} \le Thr_A$ | 8.85 | 11.00 |
| C | $Thr_C < Pow_{ratio} \le Thr_B$ | 6.60 | 13.25 |
| D | $0 \le Pow_{ratio} \le Thr_C$ | 0 | 19.85 |

Item Source Description of 16kHz signals

1 Music (jazz) followed by speech
2 Speech followed by music (classic)
3 Speech (Korean)
4 Mixed signal (noodleking)
5 Mixed signal (te16_fe49)
6 Mixed signal (twinkle_ff51)
7 Music (classic)

MULTI-MODE METHOD AND AN APPARATUS FOR PROCESSING A SIGNAL

CROSS REFERENCE TO RELATED APPLICATIONS

This application is the National Phase of PCT/KR2008/006075 filed on Oct. 15, 2008, which claims priority under 35 U.S.C. 119(e) to U.S. Provisional Application No. 60/980,149 filed on Oct. 15, 2007. The entire contents of all of the above applications are hereby incorporated by reference.

TECHNICAL FIELD

The present invention relates to a signal processing method and apparatus, and more particularly, to a signal processing method and apparatus for coding or decoding a signal by a proper scheme according to characteristics of the signal.

BACKGROUND ART

Generally, an audio encoder is capable of providing an audio signal of a high sound quality at a high bit rate over 48 kbps, while a speech encoder is able to effectively encode a speech signal at a low bit rate below 12 kbps.

DISCLOSURE OF THE INVENTION

Technical Problem

However, it is inefficient for an audio encoder according to a related art to process a speech signal. And, it is insufficient for a speech encoder according to a related art to process an audio signal.

Technical Solution

Accordingly, the present invention is directed to an apparatus for processing a signal and method thereof that substantially obviate one or more of the problems due to limitations and disadvantages of the related art.

An object of the present invention is to provide an apparatus for processing a signal and method thereof, by which such signals having different characteristics as speech signals, audio signals and the like can be processed by optimal schemes according to their characteristics, respectively.

Another object of the present invention is to provide an apparatus for processing a signal and method thereof, by which a signal having both characteristics of speech and audio signals can be processed by an optimal scheme.

Another object of the present invention is to provide an apparatus for processing a signal and method thereof, by which various signals including speech signals, audio signals and the like can be processed entirely and efficiently.

Advantageous Effects

Accordingly, the present invention provides the following effects or advantages.

First of all, a signal having a characteristic of a speech signal is decoded by a speech coding scheme and a signal having a characteristic of an audio signal is decoded by an audio coding scheme. Therefore, a decoding scheme matching each signal characteristic can be adaptively selected.

Secondly, as a bit rate corresponding to a coding scheme is allocated to a signal having both characteristics of speech and audio signals according to the characteristic strength, an optimal decoding scheme can be selected adaptively.

Thirdly, as a mode is changed per frame, a decoding scheme and a bit rate allocated to the decoding scheme are adaptively changed according to a time flow.

Fourthly, since a decoding scheme is automatically changed, an optimal bit rate can be allocated and a quality of coding can be improved.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 4 is a diagram for explaining a mode for a coding scheme;

BEST MODE

Figure 1:
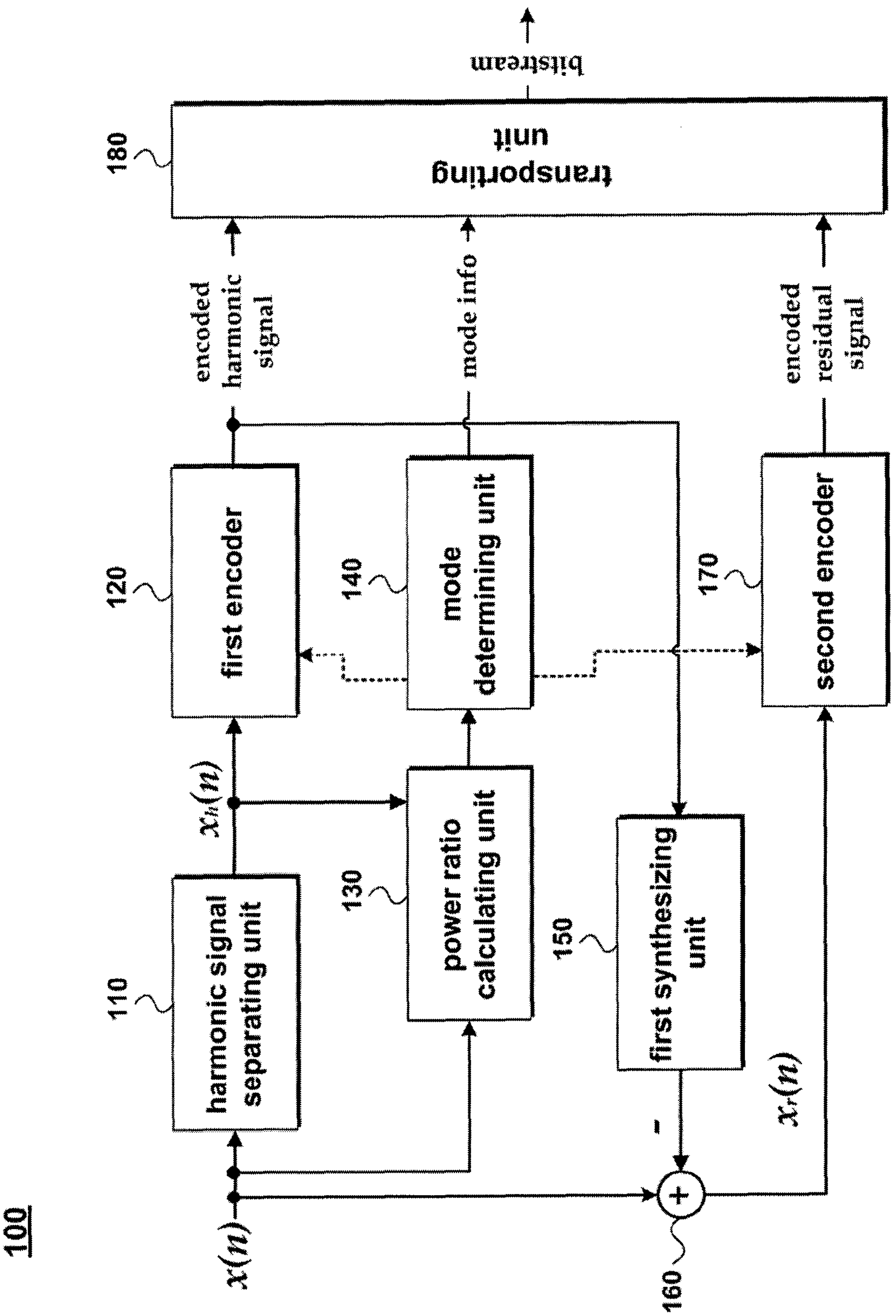
FIG. 1 is a configurational diagram of a signal encoding apparatus according to an embodiment of the present invention.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method of processing a signal according to the present invention includes receiving at least one of a first signal and a second signal, receiving mode information, and coding the at least one of the first signal and the second signal using at least one of a first coding scheme and a second coding scheme according to the mode information, wherein the mode information is information for indicating that a prescribed mode corresponds to which one of at least three modes.

According to the present invention, the mode includes a first mode for using the first coding scheme, a second mode for using both of the first coding scheme and the second coding scheme, and a third mode for using the second coding scheme.

According to the present invention, the mode information is represented as at least two flag informations.

According to the present invention, the mode information further includes bit rate information allocated to each of the first coding scheme and the second coding scheme and the mode information is determined through a plurality of Fourier transforms.

According to the present invention, the first coding scheme corresponds to a speech coding scheme and the second coding scheme corresponds to an audio coding scheme.

According to the present invention, the first signal corresponds to a harmonic signal, the second signal corresponds to a residual signal, and the second signal is obtained from a signal resulting from subtracting the first signal from an input signal.

According to the present invention, the mode information includes a first frame mode as the mode information on a first frame and a second frame mode as the mode information on a second frame, and the method further comprises the step of if the first frame mode is a first mode and the second frame mode is a third mode or if the first frame mode is the third mode and the second frame mode is the first mode, changing at least one of the first frame mode and the second frame mode into a second mode.

To further achieve these and other advantages and in accordance with the purpose of the present invention, an apparatus for processing a signal includes a receiving unit receiving at least one of a first signal and a second signal, the receiving unit receiving mode information and a coding unit coding the at least one of the first signal and the second signal using at least one of a first coding scheme and a second coding scheme according to the mode information, wherein the mode information is information for indicating that a prescribed mode corresponds to which one of at least three modes.

According to the present invention, the mode includes a first mode for using the first coding scheme, a second mode for using both of the first coding scheme and the second coding scheme, and a third mode for using the second coding scheme.

According to the present invention, the mode information is represented as at least two flag informations.

According to the present invention, the mode information further includes bit rate information allocated to each of the first coding scheme and the second coding scheme and the mode information is determined through a plurality of Fourier transforms.

According to the present invention, the first coding scheme corresponds to a speech coding scheme and the second coding scheme corresponds to an audio coding scheme.

According to the present invention, the first signal corresponds to a harmonic signal, the second signal corresponds to a residual signal, and the second signal is obtained from a signal resulting from subtracting the first signal from an input signal.

According to the present invention, the mode information includes a first frame mode as the mode information on a first frame and a second frame mode as the mode information on a second frame. And, if the first frame mode is a first mode and the second frame mode is a third mode or if the first frame mode is the third mode and the second frame mode is the first mode, the coding unit changes at least one of the first frame mode and the second frame mode into a second mode.

To further achieve these and other advantages and in accordance with the purpose of the present invention, a method of processing a signal includes extracting a first signal from an input signal, determining mode information from the input signal and the first signal, generating a second signal based on the input signal and the first signal, and encoding the first signal using a first coding scheme according to the mode information and encoding the second signal using a second coding scheme according to the mode information.

To further achieve these and other advantages and in accordance with the purpose of the present invention, a method of processing a signal includes the step of receiving mode information including a first frame mode and a second frame mode as information indicating that a prescribed mode corresponds to which one of a first mode, a second mode and a third mode, wherein if the second frame mode is the first mode, the first frame mode corresponds to either the first mode or the second mode and wherein if the second frame mode is the third mode, the first frame mode corresponds to either the third mode or the second mode.

According to the present invention, the first mode corresponds to the mode for using a first coding scheme, the third mode corresponds to the mode for using a second coding scheme, and the second mode corresponds to the mode for connecting the first mode and the third mode together.

According to the present invention, the second mode includes a forward connecting mode and a backward connecting mode.

According to the present invention, if the second frame mode is the first mode, the first frame mode corresponds to either the first mode or the backward connecting mode and if the second frame mode is the third mode, the first frame mode corresponds to either the third mode or the forward connecting mode.

According to the present invention, the first coding scheme corresponds to a speech coding scheme and the second coding scheme corresponds to an audio coding scheme.

According to the present invention, the second mode corresponds to the mode for using both of the first coding scheme and the second coding scheme.

According to the present invention, the method further includes receiving at least one of a first signal and a second signal and coding the at least one of the first signal and the second signal using at least one of a first coding scheme and a second coding scheme according to the mode information.

To further achieve these and other advantages and in accordance with the purpose of the present invention, an apparatus for processing a signal includes a receiving unit receiving mode information including a first frame mode and a second frame mode as information indicating that a prescribed mode corresponds to which one of a first mode, a second mode and a third mode, wherein if the second frame mode is the first mode, the first frame mode corresponds to either the first mode or the second mode and wherein if the second frame mode is the third mode, the first frame mode corresponds to either the third mode or the second mode.

According to the present invention, the first mode corresponds to the mode for using a first coding scheme, the third mode corresponds to the mode for using a second coding scheme, and the second mode corresponds to the mode for connecting the first mode and the third mode together.

According to the present invention, the second mode includes a forward connecting mode and a backward connecting mode.

According to the present invention, if the second frame mode is the first mode, the first frame mode corresponds to either the first mode or the backward connecting mode. And, if the second frame mode is the third mode, the first frame mode corresponds to either the third mode or the forward connecting mode.

According to the present invention, the first coding scheme corresponds to a speech coding scheme and the second coding scheme corresponds to an audio coding scheme.

According to the present invention, the second mode corresponds to the mode for using both of the first coding scheme and the second coding scheme.

According to the present invention, the receiving unit further includes a coding unit receiving at least one of a first signal and a second signal, the coding unit coding the at least one of the first signal and the second signal using at least one of a first coding scheme and a second coding scheme according to the mode information.

To further achieve these and other advantages and in accordance with the purpose of the present invention, a method of processing a signal includes determining mode information including a first frame mode and a second frame mode as information indicating that a prescribed mode corresponds to which one of a first mode, a second mode and a third mode, if the second frame mode is the first mode, changing the first frame mode into either the first mode or the second mode, and if the second frame mode is the third mode, changing the first frame mode into either the third mode or the second mode.

It is to be understood that both the foregoing general description and the following detailed description are exemplary and explanatory and are intended to provide further explanation of the invention as claimed.

MODE FOR INVENTION

Reference will now be made in detail to the preferred embodiments of the present invention, examples of which are illustrated in the accompanying drawings.

First of all, coding in the present invention should be understood as the concept of including both encoding and decoding.

FIG. 1 is a configurational diagram of a signal encoding apparatus according to an embodiment of the present invention. Referring to FIG. 1, a signal encoding apparatus according to an embodiment of the present invention includes a harmonic signal separating unit 110, a first encoder 120, a power ratio calculating unit 130, a mode determining unit 140, a first synthesizing unit 150, a subtracter 160, a second encoder 170 and a transporting unit 180. In this case, the first encoder 100 can correspond to a speech encoder and the second encoder 170 can correspond to an audio encoder.

The harmonic signal separating unit 110 extracts a harmonic signal $x_h(n)$ (or, a frequency harmonic signal) from an input signal x(n). In this case, short-time Fourier transform (STFT) and modulation frequency analysis can be performed. Details of this process will be explained with reference to FIG. 2 and FIG. 3 later.

The first encoder 120 encodes the harmonic signal $x_h(n)$ by a first coding scheme and then generates an encoded harmonic signal. In this case, the first coding scheme can correspond to a speech coding scheme. The speech coding scheme may comply with the AMR-WB (adaptive multi-rate wideband) standard, by which examples of the present invention are non-limited. Meanwhile, the first encoder 120 can further use LPC (linear prediction coding) scheme. If a harmonic signal has high redundancy on a time axis, modeling can be performed by linear prediction for predicting a current signal from a previous signal. In this case, if the linear prediction coding scheme is adopted, encoding efficiency can be raised. Besides, the first encoder 120 may correspond to a time-domain encoder.

The power ratio calculating unit 130 calculates a power ratio using an input signal x(n) and a harmonic signal $x_h(n)$. In this case, the power ratio is the ratio of a harmonic signal power to an input signal power. The power ratio can be defined as Formula 1.

$$\text{Power Ratio} = \frac{\sum_{frame} [x_h(n)]^2}{\sum_{frame} [x(n)]^2} \quad \text{[Formula 1]}$$

In Formula 1, 'n' indicates a time index, 'x(n)' indicates an input signal, and '$x_h(n)$' is a harmonic signal.

The mode determining unit 140 determines mode information on a coding scheme of the input signal x(n) based on the power ratio calculated by the power ratio calculating unit 130. In this case, the mode information is the information that indicates one of at least three kinds of modes. In this case, the three kinds of modes may include a first mode, a second mode and a third mode. The first mode corresponds to a mode that uses a first coding scheme. And, the third mode corresponds to a mode that uses a second coding scheme. Meanwhile, the second mode may correspond to either a mode that uses both of the first coding scheme and the second coding scheme or a mode for connecting the first mode and the third mode together. In the latter case, the second mode includes a forward connecting mode for connecting the first mode to the third mode, and a backward connecting mode for connecting the third mode to the first mode.

As mentioned in the foregoing description, the first coding scheme corresponds to the scheme that is performed by the first encoder 110. And, the second coding scheme corresponds to the scheme that is performed by the second encoder 170. Moreover, the second mode can include at least to different modes per bit rate that is allocated to each of the first and second coding schemes. This will be explained in detail with reference to FIG. 4 later.

Meanwhile, the first synthesizing unit 150 re-decodes the harmonic signal encoded by the first encoder 110 according to the first coding scheme. The subtracter 160 then generates a residual signal $x_r(n)$ resulting from subtracting the harmonic signal $x_h(n)$ decoded by the first synthesizing unit 150 from the input signal x(n). In this case, the residual signal $x_r(n)$ may be the signal resulting from subtracting the harmonic signal from the input signal but may be the signal obtained from the subtracted signal.

The second encoder 170 generates an encoded residual signal by encoding the residual signal $x_r(n)$ by the second decoding scheme. In this case, the second decoding scheme may correspond to an audio coding scheme. The audio coding scheme may comply with the HE-AAC (high efficiency advanced audio coding) standard, by which examples of the present invention are non-limited. In this case, the HE-AAC may result from combining AAC (advanced audio coding) technique and SBR (spectral band replication) technique together. The SBR is the technique that is very efficient at a low bit rate. The SBR is the technique of replicating a content on a high frequency band in a manner of transposing a harmonic signal from a low-frequencied band or a mid-frequencied band. Meanwhile, the second encoder 170 may correspond to a modified discrete transform (MDCT) encoder.

Meanwhile, since the signal encoded by the first encoder 120 and the other signal encoded by the second encoder 170 should be simultaneously processed by a decoder, they should have the same frequency length. To match the frame length 1,024 samples in the second encoder 170, the frame length in the first encoder 120 is set to 256 samples. And, four consecutive frames are handled as a single unit.

The transporting unit 180 generates a bitstream to transport using the encoded harmonic signal $x_h(n)$, the mode information and the encoded residual signal $x_r(n)$. In this case, the mode information can be represented as at least two flag informations. For instance, either the first coding scheme or the second coding scheme is represented as first flag information. And, bit rate information allocated to the first coding scheme (or the second coding scheme), a technique type, a window type and the like can be represented as second flag information according to the first flag information.

Figure 2:
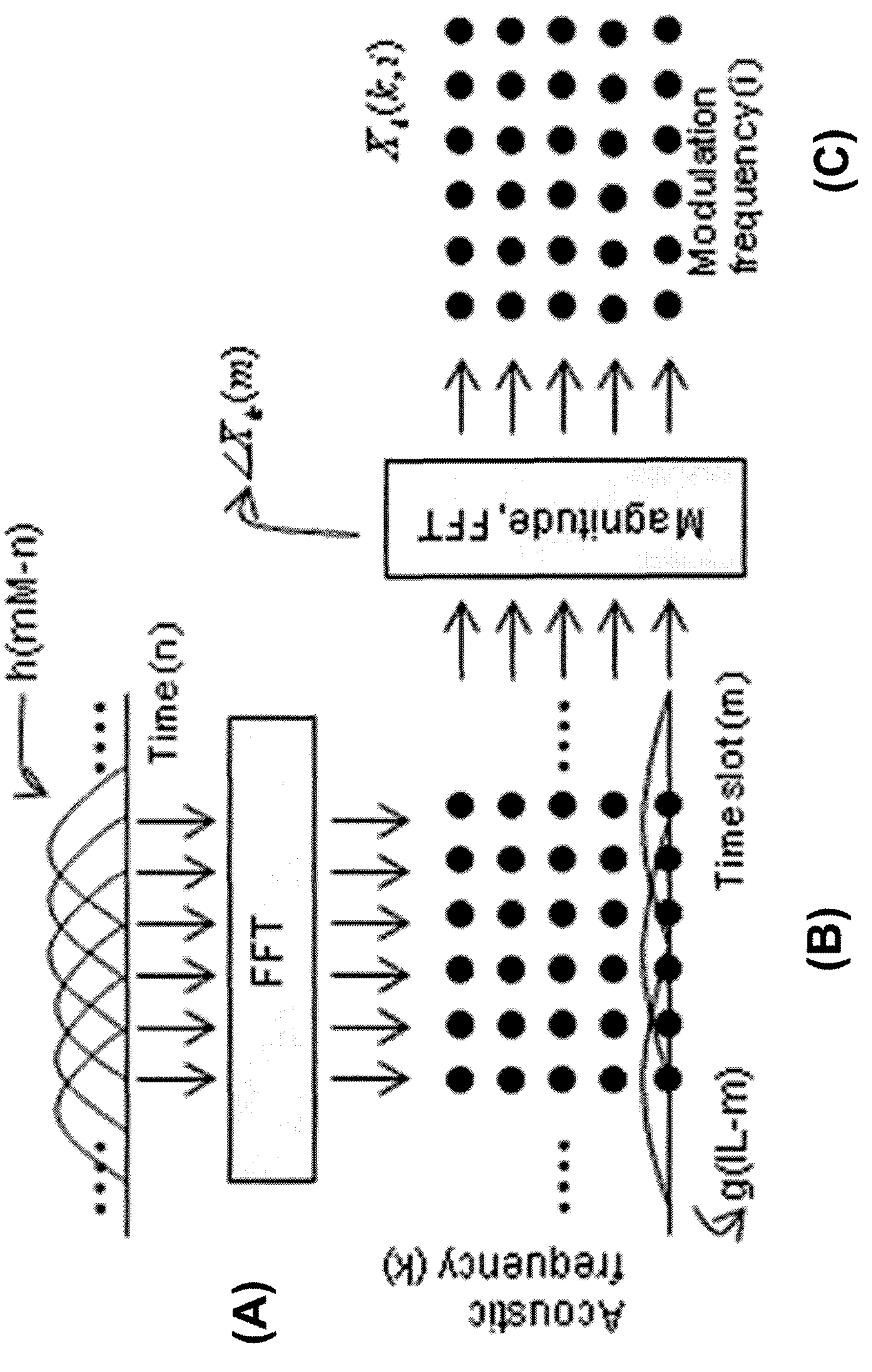
FIG. 2 is a diagram for explaining a modulation frequency analyzing process schematically.
Figure 3:
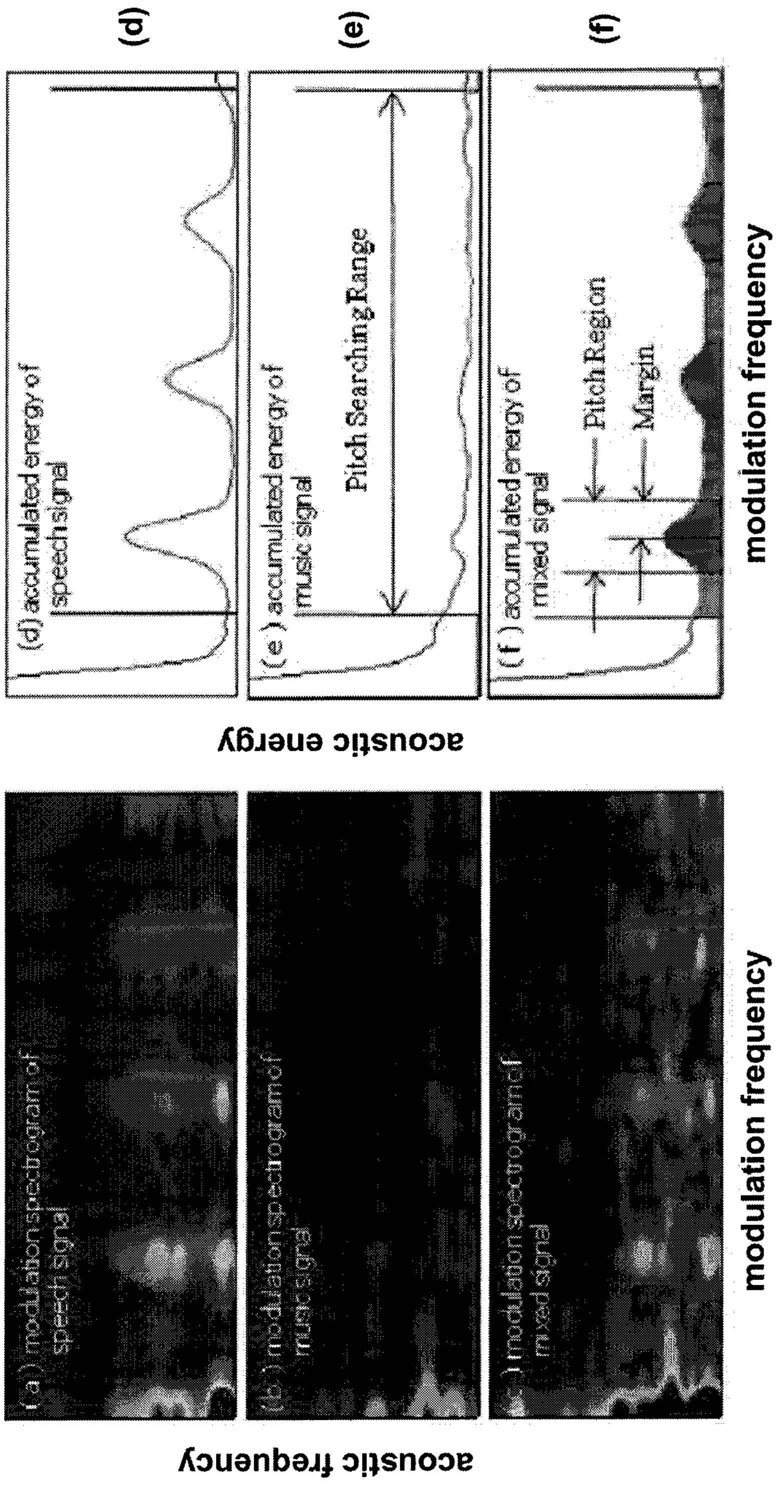
FIG. 3 is a diagram of modulation spectrogram.

FIG. 2 is a diagram for explaining a modulation frequency analyzing process schematically, and FIG. 3 is a diagram of modulation spectrogram. In the following description, a process for extracting a harmonic signal from an input signal is explained in detail with reference to FIG. 2 and FIG. 3.

Referring to FIG. 2, a subband envelope detection and a filter bank after a frequency detection of subband envelope correspond to the structure of modulation frequency analysis. The filter bank is implemented using short-time Fourier transform (STFT). For a discrete signal x(n), the short-time Fourier transform (STFT) can be represented as Formula 2. And, the envelope detection and modulation frequency analysis can be represented as Formula 3.

$$X_k(k) = \sum_{n=-\infty}^{\infty} h(mM-n)x(n)W_K^{kn},\quad \text{for } k=0, \ldots, K-1, \qquad \text{[Formula 2]}$$

In Formula 2, $W_k=e^{-j(2\pi/K)}$, 'h(n)' is an acoustic frequency analysis window, 'm' indicates a time slot index, 'M' indicates a size of h(n), 'n' indicates a time index, and 'k' indicates an acoustic frequency index.

$$X_l(k, i) = \sum_{m=-\infty}^{\infty} g(lL-m)|X_k(m)|W_I^{im},\quad \text{for } i=0, \ldots, I-1, \qquad \text{[Formula 3]}$$

In Formula 3, $W_I=e^{-j(2\pi/I)}$, g(n) is a modulation frequency analysis window, 'l' indicates a frame index, 'm' indicates a time slot index, 'L' indicates a size of window g(n), 'k' indicates an acoustic frequency index, and 'i' indicates a modulation frequency index.

Referring to (A) of FIG. 2, it can be observed that a frequency transform is performed in a manner that an acoustic frequency analysis window h(mM-n) is applied to a signal of time domain. Thus, the result of performing the frequency transform primarily, as shown in (B) of FIG. 2, becomes data corresponding to an axis of time slot (m) and an axis of acoustic frequency (k). By applying a modulation frequency analysis widow g(lL-m) to the result shown in (B) of FIG. 2 again, a modulation frequency analysis is performed again. If so, referring to (C) of FIG. 2, data $X_l(k,i)$ corresponding to an axis of modulation frequency (i) and an axis of acoustic frequency (k) is generated.

Referring to FIG. 3, modulation spectrograms are shown in (a) to (c) of FIG. 3. In particular, (a) relates to a speech signal, (b) relates to a signal including speech and music mixed together, and (c) relates to a music signal. Referring to (a) to (c) of FIG. 3, a horizontal axis corresponds to a frequency, a vertical axis corresponds to an acoustic frequency, and energy strength is represented as shading. Meanwhile, horizontal axes of (d) to (f) of FIG. 3 correspond to modulation frequencies and each vertical axis thereof corresponds to a sum of energy for whole acoustic frequencies. And, a high level appears in a pitch region. A peak point in a peak searching range shown in FIG. 3 can be calculated based on convex hull algorithm. By allowing a margin for the obtained peak point, it is able to calculate a pitch region of a harmonic component. Meanwhile, a set of modulation frequency indexes can be defined as follows.

$$Q=\{i:i(f_s/IM)\in P\} \qquad \text{[Formula 4]}$$

In Formula 4, if '$f_s$' indicates a sampling frequency, 'i' indicates a set of modulation frequency indexes in a pitch region 'P'.

Modulation frequency energy corresponding to a pitch region of a harmonic signal can be represented as Formula 5.

$$E_l^h(k)=\Sigma_{i\in Q}|X_l(k,i)|^2. \qquad \text{[Formula 5]}$$

Figure 6:
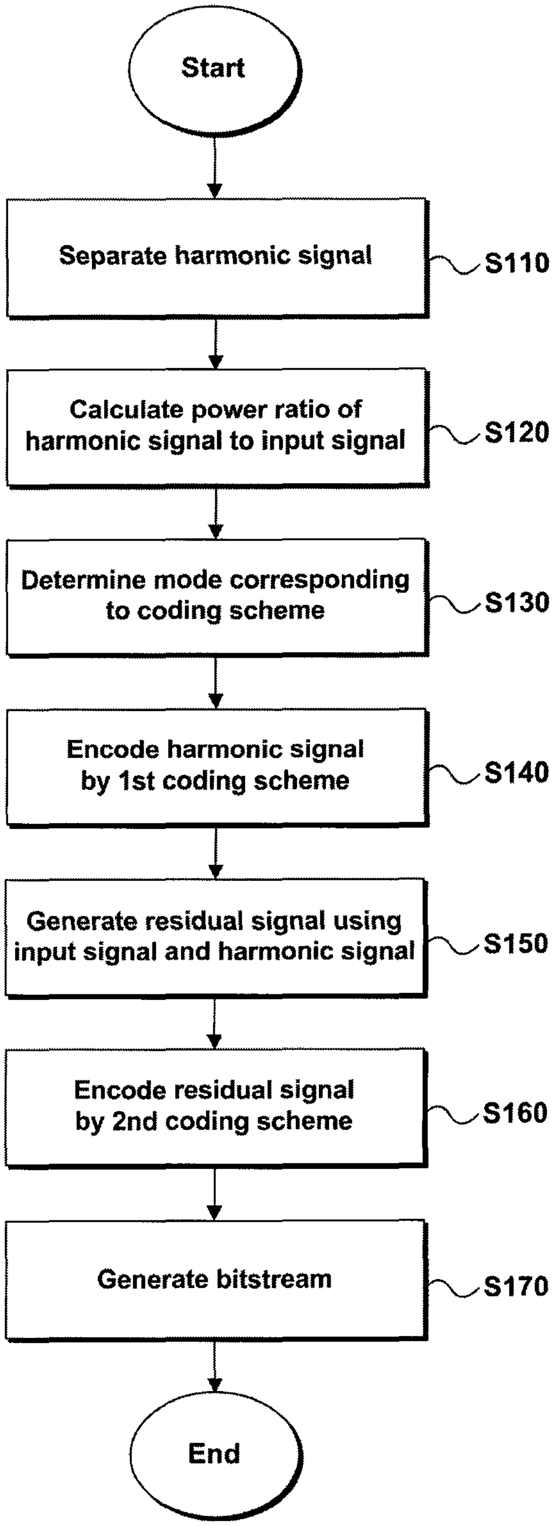
FIG. 6 is a flowchart of an encoding method according to an embodiment of the present invention.

Like FIG. 6, a range of a non-harmonic signal is regarded as located outside the pitch region.

$$E_l^r(k)=\Sigma_{i\notin Q}|X_l(k,i)|^2. \qquad \text{[Formula 6]}$$

A frequency suppression function F1 in each frame 1, i.e., a time instance n=1 (LM) can be determined from a ratio of a harmonic area to a residual area.

$$F_l(k) = \frac{E_l^h(k)}{E_l^h(k)+E_l^r(k)}, \qquad \text{[Formula 7]}$$

where 'k' indicates an acoustic frequency index and 'l' indicates a frame index.

In Formula 7, '$E_l$( )' is as good as defined in Formula 5 and '$E_r$( )' is as good as defined in Formula 6.

The value obtained from Formula 7 is multiplied to an absolute value (magnitude) of each acoustic frequency in Formula 2 to suppress a non-harmonic component of an input signal.

FIG. 4 is a diagram for explaining a mode for a coding scheme. As mentioned in the foregoing description of FIG. 1, the mode determining unit determines mode information on a coding scheme of an input signal based on the power ratio calculated via Formula 1. A first coding scheme can comply with the AMR-WB standard. AMR-WB has a sampling rate of 16 kHz and includes total nine modes with a maximum value 23.85 kbit/s. Namely, there exist modes of 6.6, 8.85, 12.65, 14.25, 15.85, 18.25, 19.85, 23.05 and 23.85 kbit/s.

Meanwhile, a second coding scheme can comply with the HE-AAC standard. The HE-AAC uses a bit rate equal to or lower than 20 kbit/s if a sampling rate is 16 kHz.

Hence, in order to use either the first coding scheme or the second coding scheme or both of the first and second coding schemes in the present invention, in case of a signal at a sampling rate of 16 kHz, a total bit rate may correspond to 19.85 kbit/s. If the total bit rate corresponds to 19.85 kbit/s is 19.85 kbit/s, it is able to use two kinds of modes 6.6 and 8.85 among the nine modes. Once a mode for activating the AMB-WB is determined, the rest of bit rates by excluding the bit rate corresponding to the AMB-WB from the total bit rate can be allocated to the HE-AAC.

Referring to FIG. 4, it can be observed that a mode A corresponds to a case that a power ratio $POW_{ratio}$ is close to 1. It can be observed that modes B and C correspond to a case that a power ratio $POW_{ratio}$ exists between predetermined values ($Thr_A$, $Thr_B$, $Thr_C$). And, it can be observed that a mode D corresponds to a case that a power ratio $POW_{ratio}$ is close to 0.

First of all, it can be observed that the mode A uses the first coding scheme (e.g., speech coding scheme) only. It can be observed that the mode D uses the second coding scheme (e.g., audio coding scheme) only. And, it can be observed that the mode B or the mode C uses both of the two schemes. The mode A corresponds to a case that the power ratio exists between a specific threshold $Thr_A$ and 1, since most of an input signal is constructed with a harmonic signal (or a frequency harmonic signal), all of the bit rate is allocated to the speech coding scheme. The mode D corresponds to a case that the power ratio exists between 0 and a specific threshold $Thr_C$, since most of an input signal is constructed with a non-harmonic signal, all of the bit rate is allocated to the audio coding scheme. Meanwhile, in case of the mode B, since a ratio of the harmonic signal is relatively high in an input signal, a bit rate (e.g., 8.85 kbit/s) relatively higher than that of the speech coding scheme is allocated and the rest (11.0 kbit/s) is allocated to the audio coding scheme. In case of the mode C, since a ratio of the non-harmonic signal is relatively high in an input signal, a bit rate (e.g., 6.60 kbit/s) relatively lower than that of the speech coding scheme is allocated and the rest (e.g., 13.25 kbit/s) is allocated to the audio coding scheme.

The above-described modes in the present invention are non-limited by a bit rate of a specific value. Although the two kinds of modes (mode B and mode C) are explained as the second mode of using at least two coding schemes for example, at least three or more modes can exist in the second mode.

Figure 5:
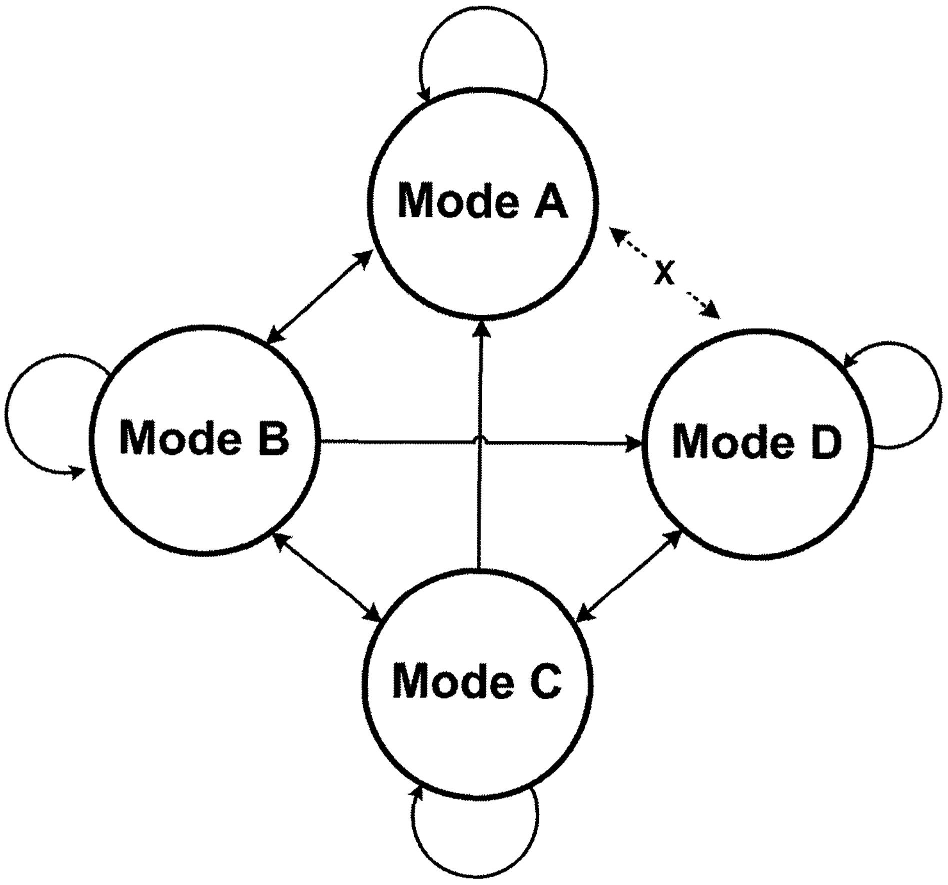
FIG. 5 is a diagram for explaining an inter-frame mode change.

FIG. 5 is a diagram for explaining an inter-frame mode change. Meanwhile, in case that at least two consecutive frames exist, perceivable discontinuity may occur between two frames according to characteristics of an input signal. In particular, when a mode A is switched to a mode D, since a frame decoded by a second coding scheme only is changed into a frame decoded by a first coding scheme only, the perceivable discontinuity may occur. Therefore, the change from the mode A to the mode D or the chance from the mode D to the mode A may not be allowed. Referring to FIG. 5, mutual switching between the mode A and the mode B, the mode B and the mode C, the mode C and the mode D or the mode B and the mode D is allowed, whereas the mutual switching between the mode A and the mode D is not allowed. In other words, the mutual switching between the first mode (mode A) and the second mode (mode B or mode C) or the mutual switching between the second mode and the third mode (mode D) is possible, while the change between the first mode and the third mode can be restricted.

If when the mode determining unit 140 described with reference to FIG. 1 determines the mode of the consecutive frames, if the restricted mode change is detected, it is able to force the mode to be changed. If the first and second frame modes are the first and third modes, respectively or if the first and second frames modes are the third and first modes, respectively, the first frame mode is changed into the second mode or the second frame mode is changed into the second mode. Of course, it is able to change both of the first and second frames modes into the second mode. In other words, if the second frame mode is the first mode, the first frame mode is changed into the first mode or the second mode (in particular, a backward connecting mode). If the second frame mode is the third mode, the first frame mode is changed into the third mode or the second mode (in particular, a forward connecting mode).

FIG. 6 is a flowchart of an encoding method according to an embodiment of the present invention.

Referring to FIG. 6, a harmonic signal is separated from an input signal [S110]. Subsequently, a power ratio of the harmonic signal to the input signal is calculated [S120]. Based on the power ratio, mode information, which is the information on a coding scheme, is then determined [S130]. As mentioned in the foregoing description, the mode information is the information indicating that a prescribed mode corresponds to which one of three kinds of modes. And, the three kinds of modes include a first mode of using a first coding scheme and a third mode of using a second coding scheme only. Moreover, a second mode is included as well. The second mode may correspond to a mode that uses both of the first and second coding schemes or may correspond to a mode for connecting the first mode and the third mode together. In the latter case, the second mode includes a forward connecting mode and a backward connecting mode.

Based on the mode information, the harmonic signal is encoded by the first coding scheme [S140]. A residual signal is then generated using the input signal and the harmonic signal [S150]. In this case, the harmonic signal can be a signal that is encoded by the first coding scheme and is then decoded by the first coding scheme again. Subsequently, the residual signal is encoded by the second coding scheme [S160]. Using the encoded harmonic signal, the encoded residual signal and the mode information, a bitstream is generated [S170].

Figure 7:
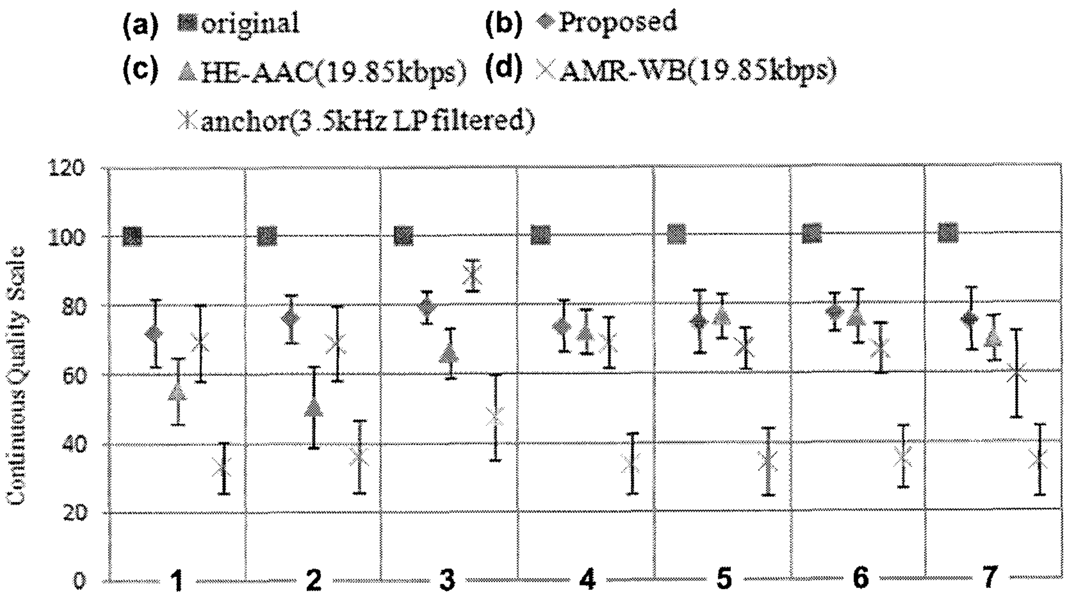
FIG. 7 is a diagram for explaining coding performance according to an embodiment of the present invention.

FIG. 7 is a diagram for explaining coding performance according to an embodiment of the present invention.

Referring to FIG. 7, it is able to observe a quality of a case of coding each of total seven sample signals according to various coding schemes. Test conditions for performance evaluation are a sampling rate of 16 kHz and 'M=16, K=512, L=32, and I=512 in Formula 2 and Formula 3'. Meanwhile, 'h(n)' indicates 48-point Hanning window and 'g(n)' indicates 64-point Hanning window. A pitch searching range corresponds to 70~485 Hz by considering a pitch search interval of AMR-WB coder. A margin for searching a pitch region is 20 Hz. And, thresholds in FIG. 4 are $Thr_A$=0.5, $Thr_B$=0.4, and $Thr_C$=0.5.

In particular, a quality in performing coding by each of a scheme (b) of the present invention, an audio coding scheme (c) and a speech coding scheme (d) can be compared to a quality of an original (a). In a signal having speech and music signals sequentially mixed (Sample 1 and Sample 2) or a signal having both of the speech and music signals simultaneously mixed (Sample 4 and Sample 6), the scheme (b) of the present invention has a quality relatively better than that of other schemes. Despite that the case of Sample 7 corresponds to a pure music signal, the scheme of the present invention provides the quality better than the case of using the audio coding scheme (cf. triangle marks).

Figure 8:
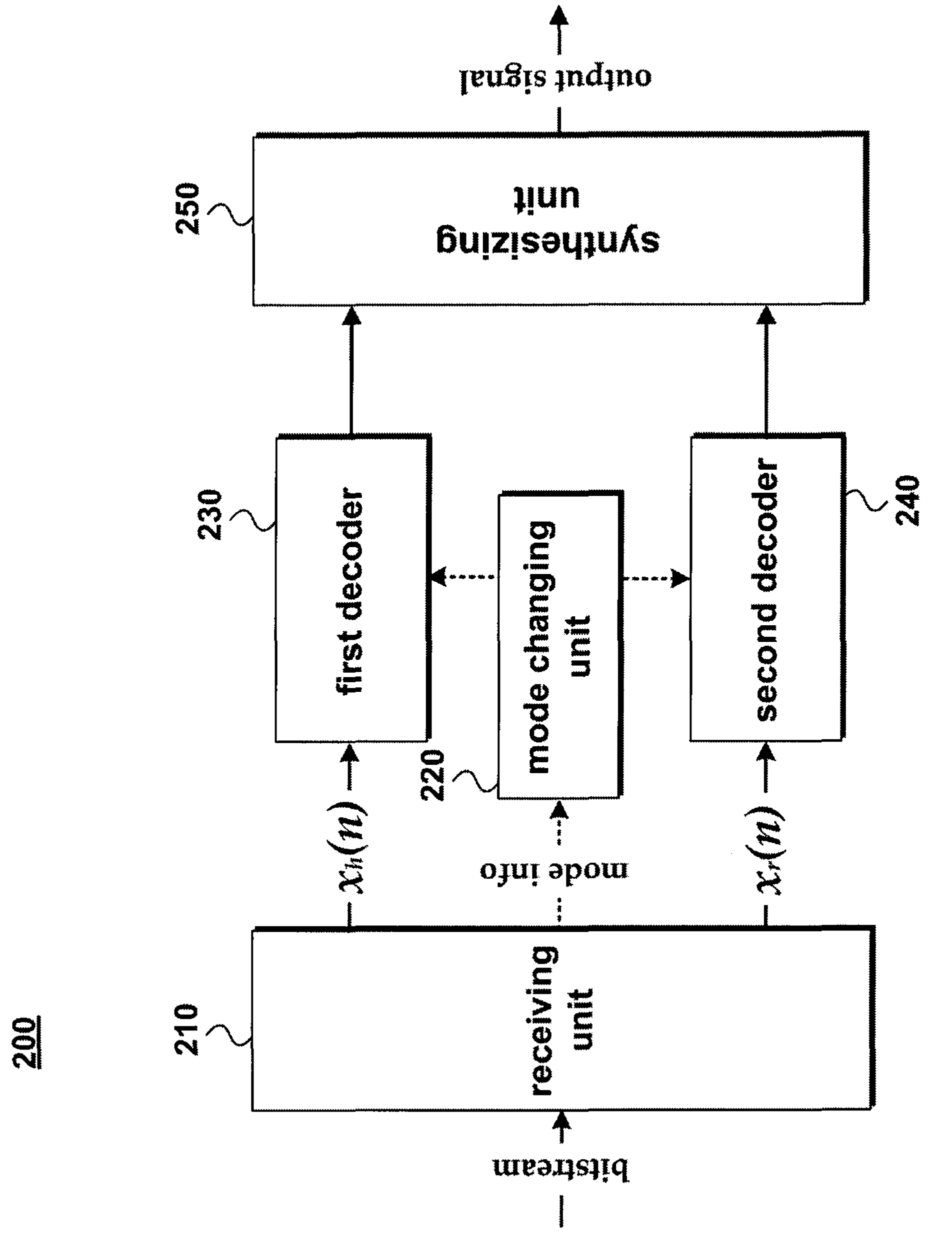
FIG. 8 is a configurational diagram of a signal decoding apparatus according to an embodiment of the present invention.
Figure 9:
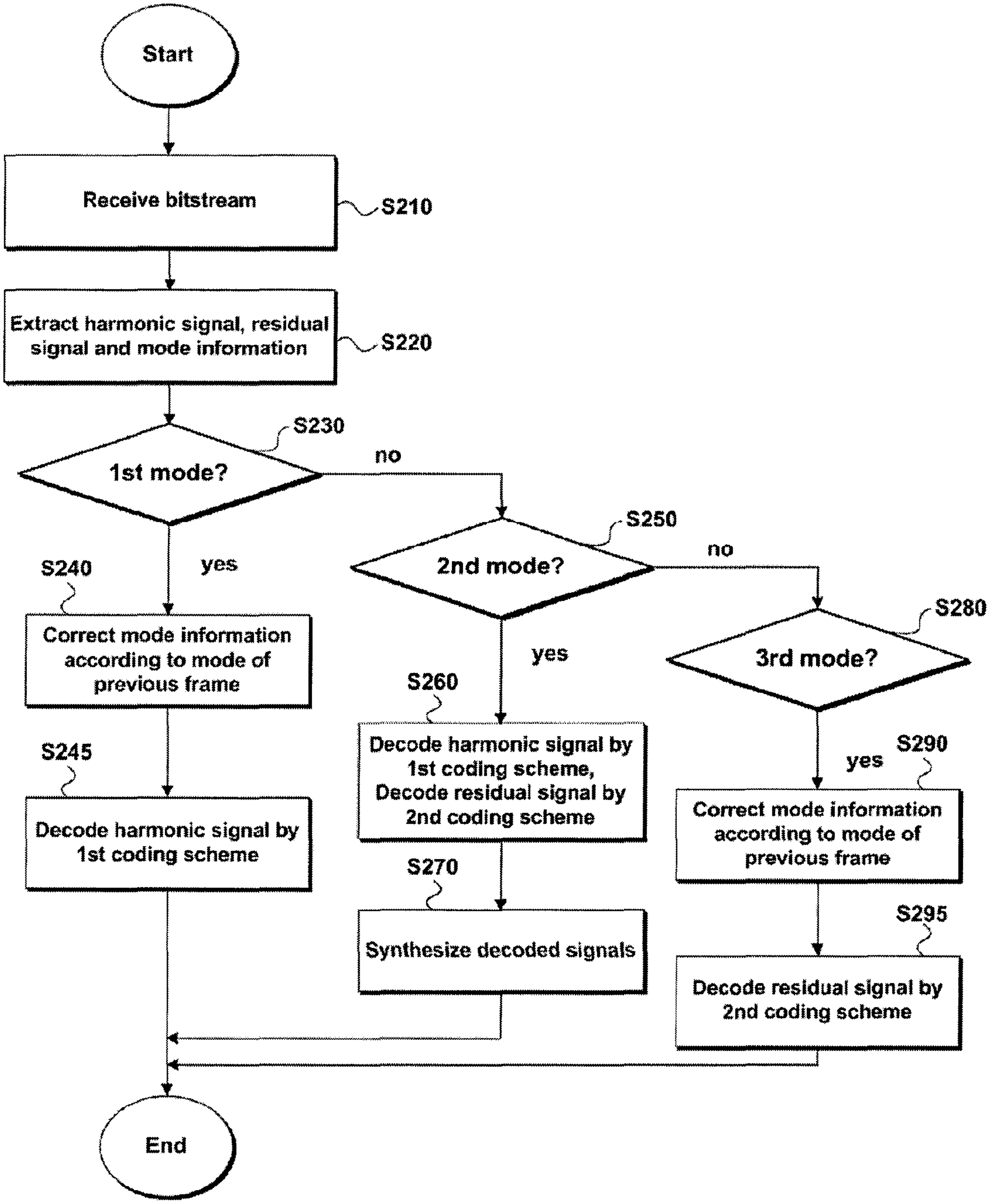
FIG. 9 is a flowchart of a decoding method according to an embodiment of the present invention.

FIG. 8 is a configurational diagram of a signal decoding apparatus according to an embodiment of the present invention, and FIG. 9 is a flowchart of a decoding method according to an embodiment of the present invention. Referring to FIG. 8, a signal decoding apparatus 200 according to an embodiment of the present invention includes a receiving unit 210, a mode changing unit 220, a first decoder 230, a second decoder 240 and a synthesizing unit 250.

The receiving unit 210 receives a bitstream and then extracts at least one of an encoded harmonic signal $x_h(n)$ and an encoded residual signal $x_r(n)$, and mode information from the bitstream. In this case, as mentioned in the foregoing description, the mode information is the information that indicates that a prescribed mode corresponds to which one of at least three or more modes. The modes, as shown in FIG. 4, include a first mode of using a first coding scheme and a third mode of using a second coding scheme only. Moreover, a second mode is included as well. The second mode may correspond to a mode that uses both of the first and second coding schemes or may correspond to a mode for connecting the first mode and the third mode together. In the latter case, the second mode includes a forward connecting mode and a backward connecting mode. Besides, the mode information, as shown in FIG. 4, can further include bit rate information of each decoder as well.

Meanwhile, the mode information included in the bitstream can include a first frame mode and a second frame mode. If the second frame mode is the first mode, the first frame mode corresponds to the first mode or the second mode (particularly, backward connecting mode). If the second frame mode is the third mode, the first frame mode corresponds to the third mode or the second mode (particularly, forward connecting mode).

The mode changing unit 220 forces the received mode to be changed if the restricted mode change is detected for mode information of at least two frames. For instance, when the first and second frame modes exist, if the first and second frames modes are the first and third modes, respectively or if the first and second frame modes are the third and first modes, respectively, at least one of the first and second frame modes is changed into the second mode. The changed mode information is transferred to the first decoder 230 and the second decoder 240. If the restricted mode change is not detected, the mode changing unit 220 transfers the received mode information to the first decoder 230 and/or the second decoder 240 as it is.

At least one of the harmonic signal and the residual signal is decoded by the first decoder 230 and/or the second decoder 240 according to whether the received mode information or the changed mode information corresponds to which one of the first to third modes. In particular, if the received mode information or the changed mode information corresponds to the first mode, the harmonic signal is decoded by the first decoder 230. If the received mode information or the changed mode information corresponds to the second mode, the harmonic signal is decoded by the first decoder 230 and the residual signal is decoded by the second decoder 240. If the received mode information or the changed mode information corresponds to the third mode, the residual signal is decoded by the second decoder 240.

The first decoder 230 decodes the harmonic signal by the first coding scheme based on the mode information. In this case, the first coding scheme can correspond to the speech coding scheme. The speech coding scheme may comply with the AMR-WB standard, by which examples of the present invention are non-limited. Moreover, the first decoder 230 may correspond to a time-domain decoder.

The second decoder 240 decodes the residual signal by the second coding scheme based on the mode information. In this case, the second coding scheme can correspond to the audio coding scheme. The audio coding scheme may comply with the HE-AAC standard, by which examples of the present invention are non-limited. The first decoder 230 decodes the harmonic signal by performing linear prediction from a linear prediction coefficient if the harmonic signal is coded by a linear prediction coding (LPC) scheme. Moreover, the second decoder 240 may correspond to MDCT (modified discrete transform) decoder.

The synthesizing unit 250 generates an output signal by synthesizing the signals decoded by the first and second decoders 230 and 240 together. In this case, since the decoded harmonic signal and the decoded residual signal should be simultaneously processed, the frame lengths should be identical to each other. Hence, if the frame length of the harmonic signal corresponds to 256 samples and if the frame length of the residual signal corresponds to 1,024 samples, four frames of the harmonic signal are handled as a single unit.

Referring to FIG. 9, a decoding apparatus receives a bitstream generated by an encoder [S210]. At least one o a harmonic signal and a residual signal and mode information are extracted from the bitstream [S220]. If the mode information corresponding to a current frame is a first mode ['yes' in a step S230], it is determined whether a mode of a previous frame is a third mode. Either the mode of the previous frame or the mode of the current frame is then corrected [S240]. For instance, if the mode of the previous frame is the third mode, the mode of the previous frame is changed into a second mode from the third mode or the mode of the current frame is changed into the second mode from the first mode. Subsequently, the harmonic signal is decoded by a first coding scheme [S240].

If the mode information corresponding to a current frame is a second mode ['yes' in a step S250], the harmonic signal is decoded by the first coding scheme and the residual signal is decoded by a second coding scheme [S260]. Subsequently, an output signal is generated by synthesizing the decoded harmonic signal and the decoded residual signal [S270]. If the mode information further includes bit rate information allocated to each of the coding schemes, each signal is decoded based on the bit rate information. For instance, the harmonic signal is decoded at 6.60 kbps and the residual signal can be decoded at 13.25 kbps.

Meanwhile, if the mode information corresponding to a current frame is a third mode ['yes' in a step S280], the mode information is corrected on the condition that the mode of the previous frame is the third mode [S290]. For instance, if the mode of the previous frame is the first mode and if the mode of the current frame is the third mode, the mode of the previous frame is changed into the second mode from the first mode or the mode of the current frame is forced to be changed into the second mode from the third mode. Subsequently, the residual signal is decoded by the second coding scheme [S295].

Moreover, the present invention can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet).

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Accordingly, the present invention is applicable to encoding and decoding of an audio signal or a video signal.

The invention claimed is:

1. A method of processing a signal, comprising:

receiving, by a decoding apparatus, at least one of a first signal and a second signal;

receiving, by the decoding apparatus, mode information, the mode information for indicating that a prescribed mode corresponds to which one of at least three modes including a first mode, a second mode and a third mode;

when the mode information indicates that the prescribed mode is the first mode, decoding, by the decoding apparatus, the first signal using a first coding scheme;

when the mode information indicates that the prescribed mode is the second mode, decoding, by the decoding apparatus, the first signal and the second signal, comprising:

decoding the first signal using the first coding scheme;

decoding the second signal using a second coding scheme; and, generating an output signal using the decoded first signal and the decoded second signal;

when the mode information indicates that the prescribed mode is the third mode, decoding, by the decoding apparatus, the second signal using the second coding scheme, wherein the mode information includes a first frame mode as the mode information on a first frame and a second frame mode as the mode information on a second frame; and detecting if a restricted mode change occurs, which includes when the first frame mode is the first mode and the second frame mode is the third mode or when the first frame mode is the third mode and the second frame mode is the first mode, and changing at least one of the first frame mode and the second frame mode into the second mode when detecting a restricted mode change, wherein the first coding scheme corresponds to a speech coding scheme, and wherein the second coding scheme corresponds to an audio coding scheme, and wherein the mode information is represented by using at least two pieces of flag information.

2. The method of claim 1, wherein the mode information further includes bit rate information allocated to each of the first coding scheme and the second coding scheme, and wherein the mode information is determined through a plurality of Fourier transforms.

3. The method of claim 1, wherein the first signal corresponds to a harmonic signal, wherein the second signal corresponds to a residual signal, and wherein the second signal is obtained from a signal resulting from subtracting the first signal from an input signal.

4. A physical apparatus for processing a signal, comprising:

a receiving unit receiving at least one of a first signal and a second signal, the receiving unit receiving mode information, the mode information for indicating that a prescribed mode corresponds to which one of at least three modes including a first mode, a second mode and a third mode, wherein the mode information includes a first frame mode as the mode information on a first frame and a second frame mode as the mode information on a second frame;

a decoding unit decoding the at least one of the first signal and the second signal using at least one of a first coding scheme and a second coding scheme according to the mode information, the decoding unit comprising:

a first decoder, when the mode information indicates that the prescribed mode is the first mode or the second mode, configured to decode the first signal using a first coding scheme; and, a second decoder, when the mode information indicates that the prescribed mode is the second mode or the third mode, configured to decode the second signal using the second coding scheme;

a mode changing unit detecting if a restricted mode change occurs, which includes when the first frame mode is the first mode and the second frame mode is the third mode or when the first frame mode is the third mode and the second frame mode is the first mode, and changing at least one of the first frame mode and the second frame mode into the second mode when detecting a restricted mode change; and a synthesis unit, when the when the mode information indicates that the prescribed mode is the second mode, generating an output signal using the decoded first signal and the decoded second signal, when the mode information indicates that the prescribed mode is the third mode, decoding, by the decoding unit, the second signal using the second coding scheme, wherein the first coding scheme corresponds to a speech coding scheme, and wherein the second coding scheme corresponds to an audio coding scheme, and wherein the mode information is represented by using at least two pieces of flag information.

5. The physical apparatus of claim 4, wherein the mode information further includes bit rate information allocated to each of the first coding scheme and the second coding scheme, and wherein the mode information is determined through a plurality of Fourier transforms.

6. The physical apparatus of claim 4, wherein the first signal corresponds to a harmonic signal, wherein the second signal corresponds to a residual signal, and wherein the second signal is obtained from a signal resulting from subtracting the first signal from an input signal.

7. A method of processing a signal, comprising:

receiving, by a decoding apparatus, at least one of a first signal and a second signal;

receiving, by the decoding apparatus, mode information, the mode information for indicating that a prescribed mode corresponds to which one of at least three modes including a first mode, a second mode and a third mode;

when the mode information indicates that the prescribed mode is the first mode, decoding, by the decoding apparatus, the first signal using a first coding scheme;

when the mode information indicates that the prescribed mode is the second mode, decoding, by the decoding apparatus, the first signal and the second signal, comprising:

decoding the first signal using the first coding scheme;

decoding the second signal using a second coding scheme; and, generating an output signal using the decoded first signal and the decoded second signal; and, when the mode information indicates that the prescribed mode is the third mode, decoding, by the decoding apparatus, the second signal using the second coding scheme, wherein the mode information includes a first frame mode as the mode information on a first frame and a second frame mode as the mode information on a second frame; and detecting if a restricted mode change occurs, which includes when the first frame mode is the first mode and the second frame mode is the third mode or when the first frame mode is the third mode and the second frame mode is the first mode, and changing at least one of the first frame mode and the second frame mode into the second mode when detecting a restricted mode change, wherein the first coding scheme corresponds to a speech coding scheme, and wherein the second coding scheme corresponds to an audio coding scheme, wherein the mode information is represented by using at least two pieces of flag information, wherein the at least one of the first signal and the second signal includes a harmonic signal and a residual signal, the second mode uses the speech coding scheme to decode the harmonic signal, and uses the audio coding scheme to decode the residual signal, and wherein a frame length of the first signal is same to that of the second signal, and the frame length is fixed.

* * * * *